F. L. POPE.
Electric Railroad Signal Apparatus.
No. 140,790. Patented July 15, 1873.
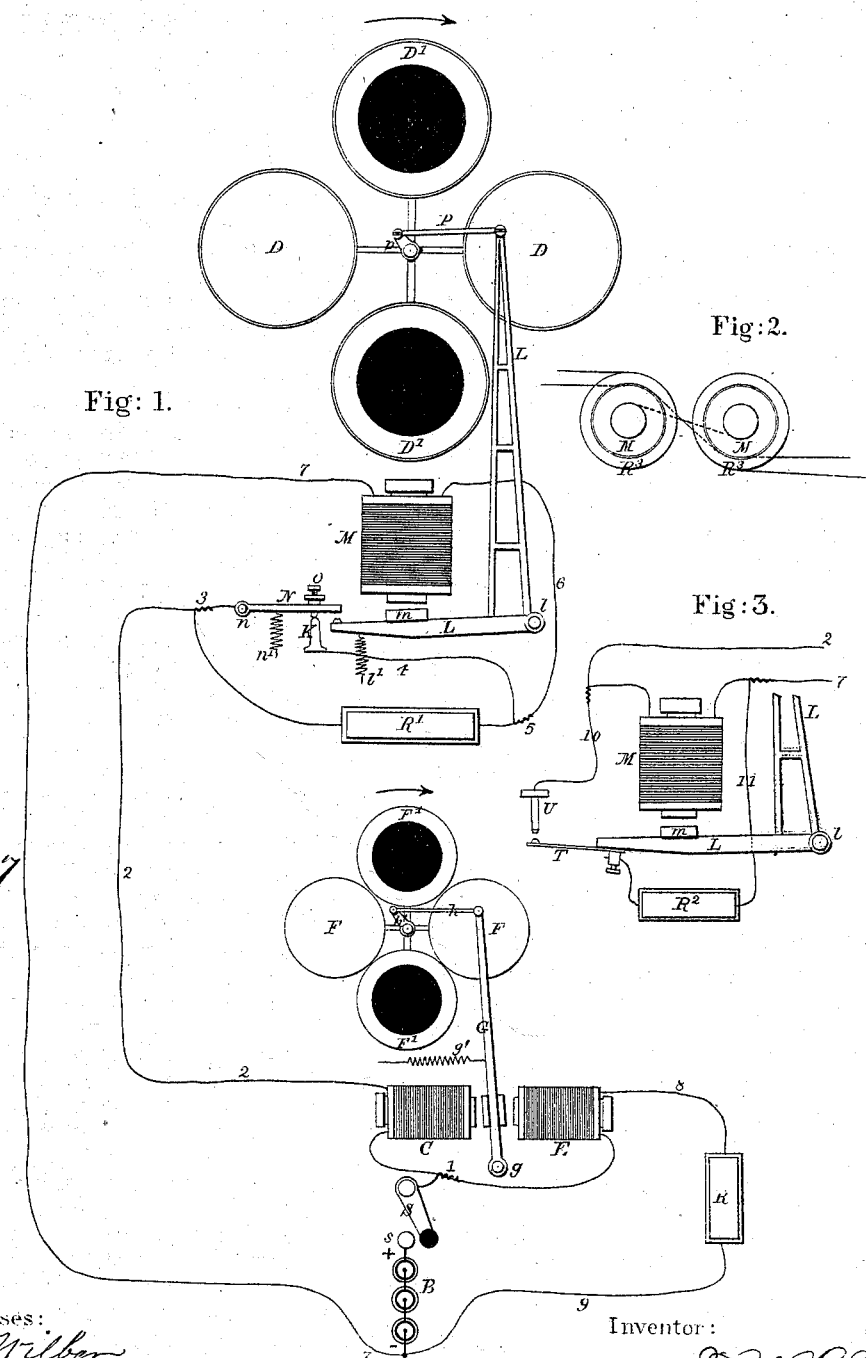
Witnesses:
Inventor:

UNITED STATES PATENT OFFICE.

FRANK L. POPE, OF ELIZABETH, NEW JERSEY.

IMPROVEMENT IN ELECTRIC RAILROAD SIGNAL APPARATUS.

Specification forming part of Letters Patent No. 140,790, dated July 15, 1873; application filed October 24, 1872.

*To all whom it may concern:*

Be it known that I, FRANK L. POPE, of the city of Elizabeth, in the county of Union and State of New Jersey, have invented certain Improvements in Electro-Magnetic Signaling Apparatus; and I hereby declare that the following is a full, clear, and exact description of the same, reference being had to the accompanying drawing, which forms part of this specification.

The object of my invention is to provide a means whereby a semaphoric or other signal may be operated at a distance by means of electro-magnetism, and the movements of said signal repeated back and indicated or recorded at or near the point from which it is operated by means of a single circuit of conductors instead of two or more circuits, which have heretofore been used for this purpose. I am thus enabled not only to render the apparatus much more simple, but also to avoid the difficulties that frequently arise from accidental contact or electrical connection between two or more circuits when they are employed to operate a signaling apparatus, in the manner hereinbefore referred to. The first part of my invention consists in arranging a primary signal of any suitable construction, together with one or more secondary signals or indicators at any required distance from each other, in connection with a single circuit of conductors; and in combining with the said primary signal a peculiar arrangement of shunt or branch circuits and rheostats, or their equivalents, brought into action by its own movements, which shall cause a variation in the strength of the electric current throughout the said circuit, thereby enabling the movements of the said primary signal to be indicated or recorded at any point in the circuit by means of secondary signals, indicators, or other equivalent devices. The second part of my invention consists in the combination of a neutralizing or balancing electro magnet or magnets of any suitable construction with a secondary signal or indicator, and a device by means of which the strength of the electric current in the circuit is varied by the movement of the primary signal, so that the movements of the said secondary signal or indicator are dependent upon those of the primary signal.

In operating an electric signal at a distance, or when the said signal is so situated that it cannot be seen by the person who operates it, it is necessary for its movements to be repeated by a secondary signal or indicator at or near the point where the operator is stationed that he may be able to know whether or not the primary signal has performed its office.

It has heretofore been necessary to make use of at least two distinct circuits, one extending from the operator to the distant or primary signal, and the other extending back from the primary to the secondary signal or indicator, as in the English patent of W. H. Preece, January 10, 1862, No. 77, and in the United States Patent of T. S. Hall, June 7, 1870, No. 103,875.

My invention accomplishes the same result by the use of a single circuit of conductors extending from the distant or primary signal to the point from which it is operated or controlled.

In the accompanying drawing, Figure 1 is a theoretical plan, showing a primary and a secouary signal and their electrical connections. Fig. 2 shows a modification in the mode of constructing the helices of the electro-magnets of the primary signal. Fig. 3 shows a modification of the shunt or branch circuit in connection with the electro-magnet of the primary signal.

In Fig. 1 I have shown a primary signal consisting of four targets, D D D' D', mounted on radial arms projecting from an axis upon which is fixed a crank, $p$. The armature $m$ of an electro-magnet, M, is fixed upon the shorter arm of an angular lever, L, the fulcrum of which is at $l$. A pitman-rod, P, connects the longer arm of the lever L with the crank $p$.

When the magnet M attracts the armature $m$, the crank $p$, by means of the lever L and pitman P, is turned through the distance of one-fourth of a revolution, in the direction indicated by the black arrow, carrying with it the targets D D D' D'.

It is unnecessary to further explain the particular construction and mode of operation of this signal, as it forms no part of my present invention, and is, moreover, fully described in my United States Letters Patent of August 27, 1872, No. 130,941.

F F F′ F′ are the targets of the secondary signal, which is constructed upon the same general principle as the primary signal, but, preferably, of smaller size. It is operated by an electro-magnet, E, and its armature-lever G, pitman $h$, and crank $h'$. C is a separate electro-magnet, similar in every respect to E, and so placed as to act in opposition to it upon the same armature, or upon another armature attached to the same lever, for purposes hereinafter to be explained. N is a supplementary lever or circuit-breaker, pivoted at $n$, and provided with an adjustable screw, O, which, when in its normal position, is kept in contact with the post K by a spring, $n'$. B is a voltaic battery, of any suitable construction; and S is a switch, for placing the same in connection with the signaling apparatus.

When the switch S is open, as shown in Fig. 1, the circuit of the battery is broken, and both the primary and secondary signals remain in the position shown in the drawing, which may, for example, if used for railway purposes, indicate "safety." The secondary signal and its attachments, including the switch S and battery B, are supposed to be placed at the point from which it is desired to operate the primary signal, while the latter may be situated at any required distance therefrom—say one mile, more or less. If, now, it is desired to change the position of the primary signal so that it will signify, for example, "danger," the operator closes the circuit, by turning the switch S so as to form an electrical contact with the stud $s$. The current flows from the positive or + pole of the battery B to the point 1, where it branches or divides. One portion traverses the magnet C, wire 2, circuit-breaker N, screw O, post K, and wire 4 to the point 5, and thence, by the wire 6 to the magnet M of the distant signal, returning by the wire 7 to the negative or − pole of the battery. The remaining portion of the current, leaving the point 1, passes through the magnet E, wire 8, rheostat R, and wire 9, to the negative pole of the battery. The rheostat R is so adjusted that the resistance offered to the current by each of the two routes diverging from the point 1 is exactly equal to that of the other. The strength of the current in each of the two circuits is therefore equal, and in consequence thereof, the attraction of the magnet E upon its armature will be exactly counterbalanced by the attraction of the magnet C in the opposite direction. Thus, no effect whatever will be produced upon the secondary signal as long as the currents passing through the magnets C and E are equal.

A shunt or branch circuit is provided between the points 3 and 5, (see Fig. 1,) which includes a suitable rheostat, $R^1$, having a resistance many times greater than the normal resistance of the circuit, which includes the magnets C and M. When the lever L has nearly or quite completed its stroke by the action of the magnet M, and the targets D D D′ D′ have nearly or quite completed one-fourth of a revolution in the direction indicated by the arrow, the extremity of the shorter arm of said lever L lifts the circuit-breaker N, which separates the screw O from contact with the post K. The circuit is then diverted through the shunt and rheostat R. Now, let us suppose, for example, that the resistance of $R^1$ is made equal to ten times that of the circuit, including the magnets C and M, when in its normal condition. When the circuit is made to pass through the rheostat, $R^1$, by a well-understood law of electrical action, the current traversing the whole circuit is reduced to one-tenth of its original strength, and the magnetic attraction of both the magnets C and M is diminished in the same proportion. Nevertheless, the amount of magnetism remaining in M is amply sufficient to prevent the armature $m$ and its attachments from returning to their original position by means of the tension of the spring $l'$. The primary signal will therefore remain displayed as long as the circuit is closed at S. The attraction of the magnet C being also reduced to one-tenth of its original amount is now no longer sufficient to counteract the attraction of the magnet E. The armature of the latter magnet is therefore drawn up nearly or quite in contact with its poles, and the lever G is thereby caused to turn the secondary signal in the direction of the arrow until its indications correspond precisely with those of the primary signal. Thus it will be understood that the secondary signal can in no case be affected until after the primary signal has been brought into its desired position. When the circuit is broken at S both the primary and secondary signals at once return to their original position by the action of the retractile springs $l'$ and $g'$.

The arrangement of the shunt-circuit and rheostat in connection with the magnet of the primary signal may be modified in various ways without affecting the principle of operation. Thus, for example, the rheostat may be constructed of fine copper wire wound in the form of a secondary concentric helix upon the magnet M, as shown at $R^3$, in Fig. 2. In this case the current passing through the rheostat aids in magnetizing the cores of the magnet M, and in holding its armature in position. The shunt may also be connected, as shown in Fig. 3, in which the rheostat is made of a considerably less resistance than the helices of the magnet M—say, for example, one-tenth as much. In this case the movement of the lever L closes the circuit between T and U. The current passing through the magnet M is now reduced to one-tenth its original amount, the remaining nine-tenths going through the rheostat. This reduces the total resistance of the entire circuit considerably, and thereby increases the strength of current proportionally. This variation of the current may be made use of in any suitable manner to operate an indicator.

The arrangement of the shunt, circuit-breaker, and rheostat first described is usually found preferable in practice.

I will here remark that an additional advantage is gained by diverting the greater portion of the current from the magnet M, or otherwise diminishing its effect thereupon when the armature has nearly completed its stroke. This advantage arises from the fact that the movement of the armature and its attachments is rendered nearly uniform throughout the stroke, for the reason that the attraction is strongest when the armature is at a considerable distance from the poles of the magnet, and weakest when it approaches near to them.

I desire it to be understood that I do not confine myself to the particular method hereinbefore described, of constructing a secondary signal or indicator to be operated by a variation in the electrical current, as there are many different devices for accomplishing this result. Instead of two magnets, C and E, a single magnet may be used, the helices of which are wound in opposite directions with two separate wires, one of which is included in each circuit; or the magnets C and E, rheostat R, and secondary signal may be dispensed with altogether, if preferred, and a simple galvanometer placed in the circuit and employed as an indicator. The angle to which the needle of the galvanometer is deflected will indicate the strength of current in the circuit, and by its indications the position of the distant signal may be known. It may also be preferable, under some circumstances, to introduce a second battery into the circuit instead of the rheostat $R^1$ or $R^2$, for the purpose of rendering the main circuit either stronger or weaker. This may be accomplished by placing the battery in the shunt-circuit in lieu of the rheostat $R^1$ or $R^2$.

When the distance of the primary signal from the point where the operator is stationed is very considerable, the apparatus may be worked by relays and auxiliary or local batteries, in a manner well understood by those skilled in telegraphy. For example, the lever G in Fig. 1, instead of operating the secondary signal directly, may be made to merely close the circuit of a local battery, the magnet of the secondary signal being included in said local circuit. Similarly, a relay may be placed in the circuit of the wire 6 7 in lieu of the magnet M, while the magnet M itself may be operated by a local battery controlled by the movements of the said relay, the electrical connections otherwise remaining as shown in Figs. 1 and 2.

An alarm-bell, or other suitable audible signal, may be placed in either the main or local circuits hereinbefore described, for the purpose of calling the attention of an attendant at any point to the movements of the visual signal or indicators.

I will also remark that the earth may be made to form a part of the circuit in lieu either of the wire 2 or the wire 7, in a manner well understood by those skilled in the art of telegraphy.

What I claim as my invention, and desire to secure by Letters Patent, is—

1. The arrangement, substantially as herein described, of the electro-magnet M and armature $m$, in combination with a circuit-changer, N, so that the movement of said armature will cause a variation in the strength of the electric current, in the circuit which includes or operates said electro-magnet, by means of which the movement of the said armature and its attachments may be indicated or recorded at any point in the said circuit.

2. The combination of a primary signal and a secondary signal or indicator, included in or operated by one and the same electrical circuit, when the movements of the latter are dependent upon and controlled by the movements of the former, substantially as herein specified.

3. The combination of the electro-magnets C and E, together with their armature or armatures, and the electro-magnet M, circuit-changer N, and rheostat $R^1$, or its equivalent, substantially as herein specified.

4. The combination of the electro-magnet M and its armature with the circuit-changer N or T and rheostat $R^1$, or its equivalent, substantially as herein specified.

FRANK L. POPE.

Witnesses:
L. P. FREUND,
Z. F. WILBER.